United States Patent [19]
Seewer

[11] 3,869,975
[45] Mar. 11, 1975

[54] PASTRY CUTTER
[75] Inventor: Ruedi Seewer, Burgdorf, Switzerland
[73] Assignee: Seewer AG, Maschinenfabrik, Burgdorf, Switzerland
[22] Filed: Apr. 9, 1973
[21] Appl. No.: 349,283

[30] Foreign Application Priority Data
Apr. 20, 1972 Germany............................. 7215054

[52] U.S. Cl................................. 99/450.2, 425/304
[51] Int. Cl............................................. A21c 11/10
[58] Field of Search............ 99/450.1, 450.2, 450.3, 99/450.4; 53/180; 425/296, 302 R, 304, 505, 514, 517

[56] References Cited
UNITED STATES PATENTS
2,490,980  12/1949  Peterson........................... 99/450.1
3,354,842  11/1967  Manspeaker.................... 425/304 X
3,508,378  4/1970  Fehr et al. ............................ 53/180
3,665,673  5/1972  Billett .............................. 53/180 X FOREIGN PATENTS OR APPLICATIONS
1,186,374  4/1970  Great Britain..................... 99/450.2

Primary Examiner—Harvey C. Hornsby
Assistant Examiner—Alan Cantor
Attorney, Agent, or Firm—Werner W. Kleeman

[57] ABSTRACT

A pastry cutter comprising a pressing tool for pressing layers of dough against one another in zones of the material which are to be cut through, and a cutting tool synchronized with said pressing tool to cut the layers of dough at the pressed regions.

5 Claims, 5 Drawing Figures

PASTRY CUTTER

BACKGROUND OF THE INVENTION

The present invention relates to a new and improved construction of pastry cutters.

It is common in the mechanical manufacture of patisserie or pastry of the type including a filling, for one of the numerous successive process steps to consist of, subdividing a filled flat tube of dough into longitudinal sections or cutting-out pieces of rectangular, round or other shape from material which consists of two strips of dough and a layer of filling between them. In such dividing-off or cutting out operations care must be taken that the filling does not exude at the cutting points either immediately or subsequently. Any such exudation of the filling will give rise to the disadvantages that:

1. As a result of smudging the resulting pastry will be untidy and thus detracts from the customer appeal of the finished material.
2. Any further processing of the divided-off or cut-out pieces, for example feeding them into the baking oven, is associated with difficulties which interfere with production and thus increased control becomes necessary.
3. The envisaged selling weight of the finished pastry varies to an unacceptable extent.

In order to avoid these phenomena it has heretofore been customary to use a dabbing or dosing filling for applying the filling to a strip of dough. Using an instrument suitable for this purpose heaps of filling are deposited at given spaced locations for one another and then, in a further process step, a second strip of dough is placed on top and allowed to sink of its own accord down between the individual heaps of filling onto the lower strip of dough, with the result that the danger of exudation of filling at the cutting points is avoided.

However, for steamlined manufacture it is clearly more desirable to be able to either apply considerably narrower continuous ribbons of filling along the center of strips of dough lying alongside one another on a conveyor belt and then to fold over such ribbons of filling the side edges of the strips of dough which have been left free, so as to form flat filled tubes of dough or to apply a continuous layer of filling onto a broad strip of dough lying on a conveyor belt and then to place a second strip of dough onto this layer of filling. However, in these cases as the filled tubes of dough are separated or shaped pieces are cut-out from such a web of material consisting of the layer of filling and the strips of dough, the above-mentioned difficulties with regard to exudation or oozing-out of the filling at the cutting points arise.

SUMMARY OF THE INVENTION

Hence, it will be recognized from what has been discussed above that this particular field of technology is still in need of pastry manufacturing equipment which is not associated with the aforementioned drawbacks and limitations of the prior art proposals. It is therefore a primary object of the present invention to provide an improved construction of pastry manufacturing equipment which effectively and reliably overcomes the aforementioned drawbacks and disadvantages existent with the prior art proposals.

Another and more specific object of the present invention relates to an improved construction of pastry cutter for effectively, reliably and efficiently cutting the dough during the manufacture of pastry in a manner avoiding the aforementioned drawbacks.

Yet a further significant object of the present invention relates to an improved construction of pastry cutter for use in pastry manufacturing equipment allowing for streamlined manufacture at a relatively high production rate, while avoiding the aforementioned drawbacks, and wherein the pastry cutter itself is of relatively simple design, economical to manufacture, easy to use, and not readily subject to breakdown.

According to the present invention there is provided a pastry cutter comprising a pressing tool for pressing layers of dough against one another in zones of the material which are to be cut through, and a cutting tool synchronised with said pressing tool to cut the layers of dough at the pressed regions. Preferably the cutter is associated with an endless conveyor belt above which said pressing and cutting tools are mounted.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
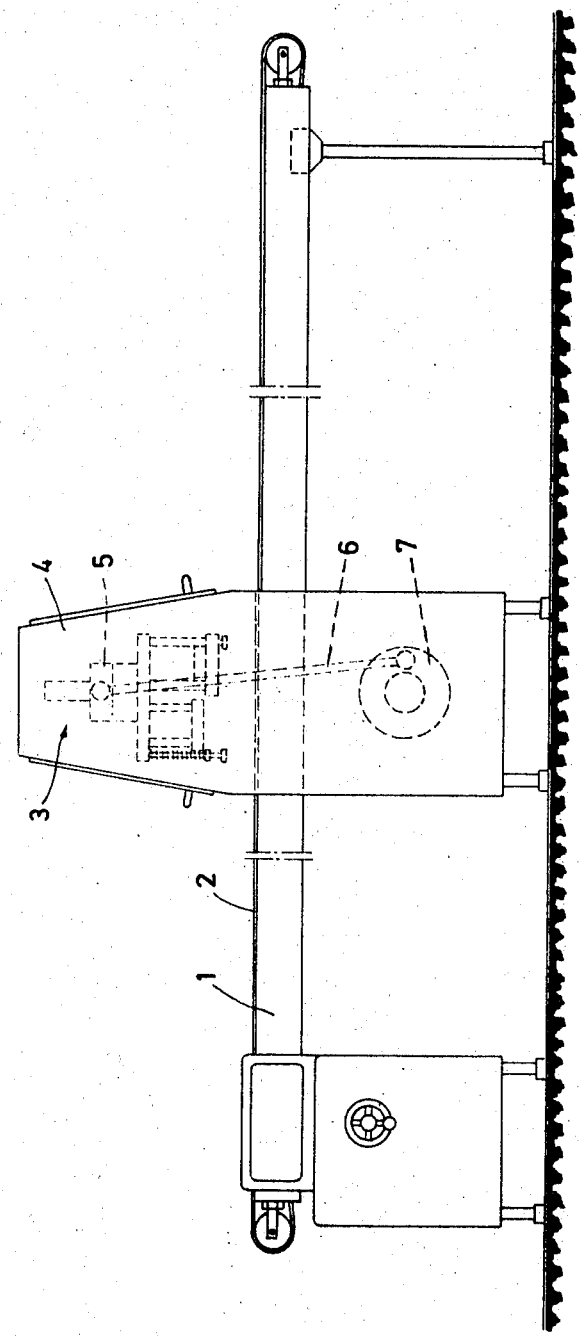
FIG. 1 is a schematic elevational view of a pastry preparation or manufacturing installation in which the pastry cutter designed according to the teachings of the present invention is employed.

Describing now the drawings, in FIG. 1, a conveyor table of a well known pastry preparation installation is merely indicated by its framework 1 and its endless conveyor belt 2.

Figure 2:
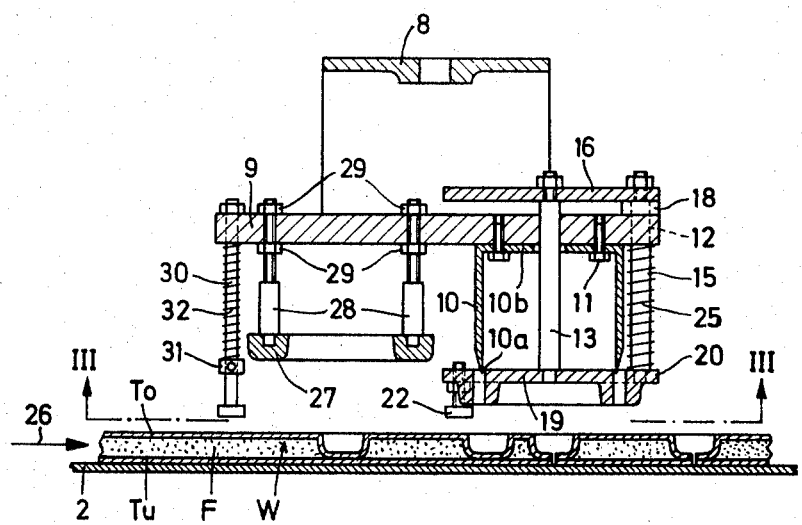
FIG. 2 is a section along a vertical plane extending in the longitudinal direction of a conveyor belt belonging to the installation, and showing only the parts of the pastry cutter which are important for an understanding of the invention, these parts being shown in their top dead center position, raised from the conveyor belt.
Figure 3:
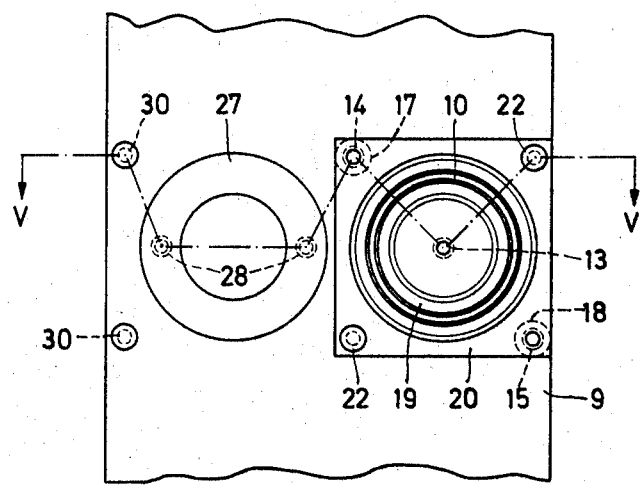
FIG. 3 is a bottom view, taken along the plane III—III of FIG. 2.
Figure 4:
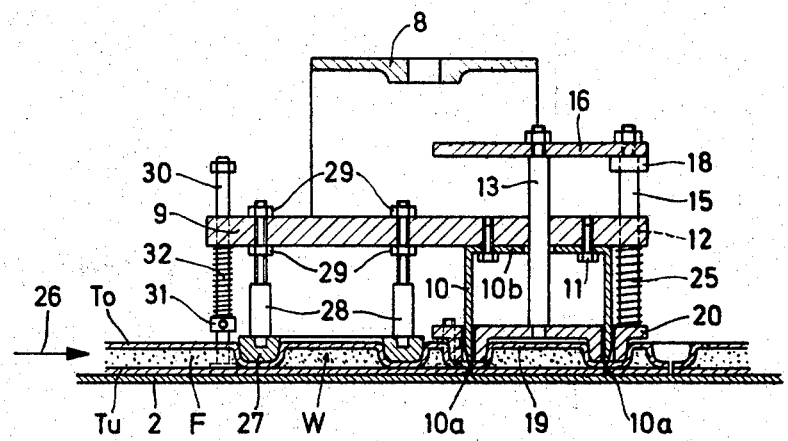
FIG. 4 is a section similar to the showing of FIG. 2, but depicting the pressing tool and cutting tool of their working position.
Figure 5:
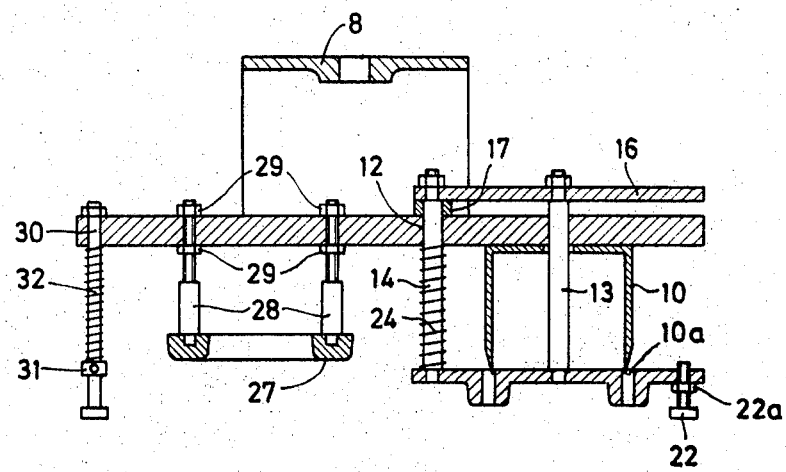
FIG. 5 is a sectional view substantially along the line V—V of FIG. 3, the moving parts being shown in the same position as in FIG. 2.

The pastry cutter of the present invention is mounted above the table 1, 2 and is intended for cutting through the material W resting on the conveyor belt 2. In FIGS. 2 and 4, the material W to be cut consists of a lower strip of dough $T_u$, an upper strip of dough $T_o$, and a filling F therebetween. In the upper part of the drive unit 4 of the installation there is guided a ram 5, similar to the case of the punching machine or punch press, so as to be capable of reciprocation between the upper dead center position (FIG. 2) and a lower dead center position (FIG. 4). The ram 5 is connected by a connecting rod 6 to a motor-driven crank cam 7 or the like.

The pastry cutter according to the present invention is illustrated as a combined cutting and pressing unit, described below with reference to FIGS. 2 to 5, connected in an easily detachable manner to the underside of the ram 5 by securing a connecting section 8 to the ram 5 using fixing bolts (not shown) or other suitable connection means. A carrier or support plate 9 is fixed to the bottom of the connecting section 8.

A cutting tool 10 is secured to the underside of the carrier plate 9 by means of screws 11, and in the depicted embodiment this cutting tool 10 is intended for cutting round or rounded shapes out of the material W. The cutting tool 10 consists of a vertical hollow cylinder which has the cutting edge 10a at the bottom and a fixing flange 10b at the top, with holes for fixing the screws 11.

Carrier bolts 13, 14, 15 are located so that they can slide in vertical bores 12 of the carrier plate 9, the bolt 13 being centrally disposed and bolts 14 and 15 being located outside the cutting tool 10. The upper ends of the bolts 13, 14 and 15 are fixed to a yoke plate 16, and stop rings 17 and 18, respectively, are additionally mounted on the two outer carrier bolts 14, 15 below the yoke plate 16. A central hold-down component 19 is fixed to the lower end of the inner bolt 13, while an external ring-shaped hold-down component 20 is fixed to the lower ends of the outer bolts 14, 15; the cutting tool 10 extending through an annular or ring-shaped slit 21 which has been left free between the inner and outer hold-down components 19, 20. Two stop bolts or screws 22, projecting downwards from and mounted on the hold-down component 20 are secured thereto by lock nuts 22a. The stop bolts 22 are intended to rest on the conveyor belt 2 in the working position (FIG. 4) and should therefore be adjusted on the hold-down component 20 in accordance with the intended final thickness of the material W at the region of pressing. The carrier bolts 14 and 15 are each surrounded by a spiral or helical spring 24 and 25, respectively. These spiral springs are positioned between the carrier plate 9 and the hold-down component 20 and resiliently yield during the last part of the downward stroke of the carrier plate 9 after the stop bolts 22 have made contact with the conveyor belt 2. In the first part of the upward stroke of the carrier plate 9 together with the cutting tool 10 the springs 24, 25 hold the outer hold-down component 20, and hence the inner hold-down component 19 rigidly connected thereto by the components 14, 15 16 and 13, in the bottom position in order to prevent lifting due to the material W possibly tending to adhere to the lower part of the cutting tool 10 as a result of the cutting process.

It is important that a pressing tool 27 is combined with the cutting tool 10 (or with the cutting unit consisting of the cutting tool 10 and the hold-down device 19, 20), and that the pressing tool should precede the cutting tool in the conveying direction 26 of the conveyor belt 2, so that during a working cycle of the equipment, the pressing tool 27 should press together the dough layers $T_o$ and $T_u$ in the zone of the material W which is to be cut through during the next working cycle of the equipment, and the filling F should be displaced laterally from this zone when pressing the layers of dough togther. It logically follows from the task of this pressing tool 27 that its outline shape should correspond to that of the effective part of the cutting tool 10 and that the distance between the centers of the two tools should correspond to the length of travel which the conveyor belt 2 executes between two successive strokes of the ram 5 carrying tools. In the embodiment shown, the pressing tool 27 consists of a ring, the mean diameter of which is about the same as the diameter of the knife or blade 10a of the cutting tool 10. It is mounted by means of threaded bolts 28 and 29 on the carrier plate 9, so as to be adjustable in height. The height adjustment must be made while taking into account the sum of the thickness of the two strips or layers of dough, $T_o$ and $T_u$, so that these strips are only pressed against one another and in doing so are only squeezed slightly or not at all.

Vertically displaceable pressure compensating bolts 30 are carried on the end of the carrier plate 9 remote from the cutting tool 10. Each of these bolts 30 carries a spring 32 which is positioned between and in abutting relationship with the carrier plate 9 and a longitudinally displaceable ring 31 mounted on each bolt 30. During the downward stroke, the bolts 30 come to rest on the conveyor belt 2 approximately simultaneously with the stop bolts 22 of the hold-down component 20, and the pressure of the springs 32 is intended to approximately balance that of the springs 24, 25 in order to avoid any asymmetric load on the carrier plate 9.

It should be obvious that the rounded outline shape of the cutting tool 10 and of the pressing tool 27 are only to be considered as an example amongst numerous possible shapes. If, for example, the cutting tool is a single rectilinear knife which extends transversely to the conveying direction 26 of the coveyor belt 2 (for instance for subdividing filled tubes of dough into longitudinal sections), the pressing tool will consist of a pressing beam which similarly extends transversely of the conveying belt 2. If the tool 10, 27 have an outline spaced which is in itself a closed shape, several of the combined cutting and press devices described above can be arranged next to one another in an array extending across the belt 2.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A pastry cutter comprising conveying means for advancing layers of dough along a predetermined path of travel, a pressing tool for pressing the layers of dough against one another in zones of the material which are to be cut through, a cutting tool, means for synchronizing said cutting tool with said pressing tool to cut the layers of dough at the pressed regions, said synchronizing means comprising a carrier plate at the underside of which are secured the pressing tool and the cutting tool in a position above said conveying means, means mounting the carrier plate for movement up and down, said pressing and cutting tools being axially spaced from one another at said carrier plate in the direction of travel of the conveyor means.

2. A pastry cutter comprising an endless conveyor belt for movably supporting layers of dough along a predetermined direction of travel, a pressing tool for pressing the layers of dough against one another in zones of the material which are to be cut through, a cutting tool, means for synchronizing said cutting tool with said pressing tool to cut the layers of dough at the pressed regions, said synchronizing means comprising a carrier plate at the underside of which are secured the pressing tool and the cutting tool in a position above said conveyor belt, means mounting the carrier plate for movement up and down, said pressing and cutting tools being spaced from one another in the direction of travel of the conveyor belt, a hold-down device supported by the carrier plate for movement up and down relative to the carrier plate, said hold-down device being located by carrier bolts, a yoke for rigidly connecting said carrier bolts to one another, said bolts being surrounded by pressure springs acting between the hold-down device and the carrier plate, said hold-down device further being provided with at least one vertically adjustable stop bolt which projects downward therefrom.

3. The pastry cutter as defined in claim 2, wherein the hold-down device has a slit through which passes the cutting tool.

4. The pastry cutter as defined in claim 2, further including means for fixing the pressing tool to the carrier plate so as to be adjustable in height relative to the carrier plate.

5. The pastry cutter as defined in claim 4, wherein the fixing means comprises threaded nuts and bolts.

* * * * *